United States Patent Office 3,846,309
Patented Nov. 5, 1974

3,846,309
ROTARY CONICAL STRAINER DRUM
Lars Karl Johan Ehnstrom, Tullinge, Sweden, assignor to Alfa-Laval AB, Tumba, Sweden
Filed Mar. 15, 1972, Ser. No. 234,824
Claims priority, application Sweden, Mar. 23, 1971, 3,723/71
Int. Cl. B01d 21/26
U.S. Cl. 210—370
4 Claims

ABSTRACT OF THE DISCLOSURE

Liquid to be strained is fed to the interior of a perforated conical drum rotating about the axis of its cone shape; and a conical outer strainer concentrically surrounds this drum and rotates therewith, the outer strainer widening in the same direction as the conical drum and having a less rigid envelope surface and a smaller hole size than the drum. Nozzles are arranged to spray liquid against the outside of the outer strainer, through which the strained liquid passes after separation of coarse solids by the drum and finer solids by the outer strainer; and these separated solids discharge from the free edges of the conical drum and outer strainer at their wide ends.

THE DISCLOSURE

The present invention relates to a rotary conical strainer drum which is perforated and provided interiorly with an inlet for the liquid to be strained, nozzles being arranged to spray liquid against the outside of the drum to clean the strainer surface from clogging material.

Such a strainer drum is disclosed in Swedish patent specification 113,137. Two demands are made upon this drum, which are contradictory from a design point of view. That is, on one hand the strainer drum must be so sturdy that it can receive, carry and transmit a sludge quantity of substantial weight, and on the other hand the strainer drum must also be capable of straining off small particles. However, conventional fabricating technique does not allow manufacture of strainers with a small hole size without the drum wall proper having a relatively small strength. One solution of this problem may consist of an arrangement of two different strainers, so that a first strainer removes coarse constituents and a second strainer removes fine constituents from the liquid strained in the first strainer. Such an arrangement, however, is expensive and requires a large space.

The present invention solves this problem in that said sheet drum is surrounded concentrically by a conical outer strainer, rotatable with the drum, which widens in the same direction as said drum and has a less rigid envelope surface and a smaller hole size than the drum, such as a strainer cloth or a perforated foil. The strainer cloth or the foil is preferably made of a metallic material, such as nickel. In addition to solving the above-mentioned problem, this new arrangement has the advantage that the spray from the nozzles, due to the more pliant nature of the outer strainer, acts to vibrate the latter's envelope surface and thereby contribute to releasing and conveying away the material tending to clog the strainer holes. An especially effective vibration effect in this respect is obtained by arranging the spray nozzles to spray the outer strainer along a generatrix of its envelope surface, obviously since all spray nozzles cooperate in effecting a deformation formed along a whole generatrix of the envelope surface and which proceeds along the periphery of the envelope surface as the strainer rotates. In addition, the spraying along a generatrix (against only a small part of the envelope surface) allows more time for the sludge particles to be re-dewatered after the spraying and before they leave the outer strainer.

The inner strainer drum, which must separate off the large sludge quantities, may be made with a hole size of 100 to 200$\mu$, as when a mash is to be strained. According to a preferred embodiment of the invention, the outer strainer in this case is made with a hole size of 20 to 50$\mu$. Thus, it is possible to effect a fractionated straining, in that the holes with the size of 20 to 50$\mu$ let through protein particles, which consequently are recovered separated from a hull fraction rich in cellulose.

The invention is described more in detail below, reference being made to the accompanying drawing in which the single illustration is a sectional view, partly in side elevation, of an example of the new apparatus.

In the drawing, a housing 1 surrounds a conical strainer drum 2 of perforated sheet material. It is assumed that this strainer drum has a hole size of 100 to 200$\mu$. The drum 2 is brought into rotation by means of a shaft 3 journalled in the housing 1 and supporting this drum at its narrow end for rotation about the axis of its conical shape. Fixed to the outside of the drum 2 is a conical strainer cloth 4 rotatable with the drum and made of a nickel fabric having a hole size which is assumed to be 20 to 50$\mu$, the narrow end of strainer 4 being secured to the narrow end of drum 2.

A tube 5 supplies the liquid to be strained to the narrow end of the drum, which has an end wall 6 provided with conventional entraining means 7 for bringing the supplied liquid into rotation. The entraining means 7 throws the supplied liquid outward against the inside of the drum 2. A tube 8 supplies washing liquid to an annular aggregate 9 of nozzles, which spray the inside of the drum 2. At the inside of the upper wall of the housing 1 are nozzles 10 which are spaced from the drum 2 and the straining cloth 4 by a distance which decreases in the direction toward the wide ends of the drum and cloth. The nozzles 10 are arranged to spray the strainer cloth 4 with flat jets (fan-shaped) along a continuous zone which has a width of about 5 cm. and extends along the generatrix of the envelope surface of the strainer cloth. An outlet for washed sludge which has been strained off is shown at 11, and an outlet for strained liquid is shown at 12.

In the operation of the apparatus as illustrated, mash containing about 20% of solids is supplied by tube 5 to the interior of the rotating drum 2 and is thrown by the entraining means 7 outward against the inner surface of the drum. Coarse solids slide along the latter surface to the wide end of the drum while being washed with water sprayed from the nozzles 9. The washed sludge is thrown centrifugally from the free edge of the drum 2 at its wide end and discharges through the outlet 11. The wort freed from the coarsest sludge passes together with the wash water through the drum holes and reaches the inside of the strainer cloth 4, where additional quantities of sludge are separated off. This finer sludge is thrown centrifugally from the free edge of the strainer cloth 4 at its wide end and is likewise discharged through the outlet 11. Strained wort and wash water pass through the strainer cloth 4 and are discharged through the outlet 12.

The flat jets from the nozzles 10 extend over such angles (for instance, 80 to 120°) that they spray a continuous generatrix of the envelope surface of the strainer cloth 4. The spraying liquid used here also consists of water, which is supplied to the nozzles 10 with a pressure of about 5 bars. The water jets from these nozzles penetrate the holes in the strainer cloth 4 as well as the strainer drum 2 and thus clean these holes from clogging material. In order to counteract the centrifugal force, which is greater at a greater diameter, the water jets from the nozzles 10 are caused to act upon the surface of the strainer cloth from a shorter distance, the closer the nozzles are located to the wide end of the strainers. The water jets which have passed through the strainer cloth 4 and the strainer drum 2 turn back to the strainer surfaces, due to the generated air currents, and then pass through these surfaces together with the liquid being strained. The spraying from the nozzles can take place eithr continuously or intermittently during the straining operation. Also, spraying can be undertaken prior to or after a straining operation, while the strainers are rotating. As a result of the deformation of the strainer cloth 4, effected by the spraying and proceeding along the periphery of the envelope surface of the strainer cloth, a vibration is imparted to the latter which contributes to the cleaning of the strainer cloth. If it is desired to avoid dilution of the strained liquid, the nozzles 9 and 10 can be supplied with liquid which has previously passed through the strainers.

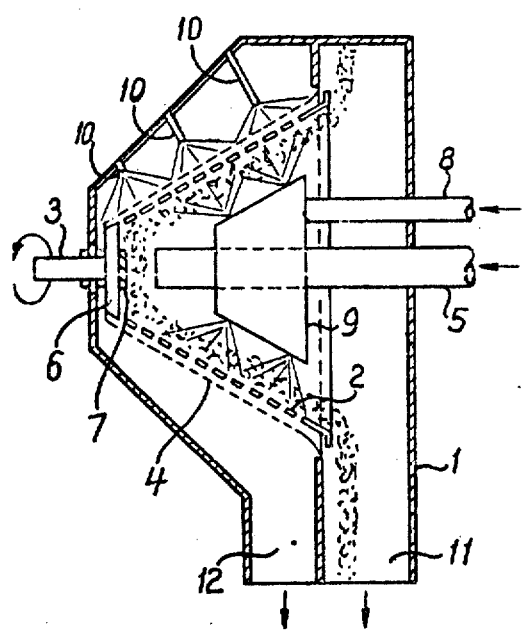

I claim:

1. The combination of a cone-shaped strainer drum made of perforated sheet material and mounted for rotation about the axis of said cone, means for supplying a liquid to be strained to the interior of said drum, said drum having a relatively wide end for discharging solids strained from said liquid, a conical outer strainer concentrically surrounding said drum and rotatable therewith, said conical outer strainer widening in the same direction as said conical drum and having a less rigid envelope surface and a smaller hole size than said drum, and nozzles positioned to spray liquid against the outside of said outer strainer, said nozzles being positioned to spray said outer strainer along a generatrix of its envelope surface and thereby vibrate the outer strainer during rotation of said drum and outer strainer said drum being sufficiently sturdy to receive, carry and transmit a sludge quantity of substantial weight, said outer strainer being capable of straining off smaller particles than said drum.

2. The combination according to claim 1, in which said conical strainer is a cloth.

3. The combination according to claim 1, in which said conical strainer is a perforated foil.

4. The combination according to claim 1, in which said outer strainer has a hole size of 20 to 50$\mu$.

References Cited

UNITED STATES PATENTS

| 2,367,961 | 1/1945 | Piponius | 210—380 X |
| 2,752,043 | 6/1956 | Van Riel | 210—380 X |

FOREIGN PATENTS

| 139,396 | 1/1947 | Australia | 210—369 |

JOHN ADEE, Primary Examiner

F. F. CALVETTI, Assistant Examiner

U.S. Cl. X.R.

210—378, 380, 384

UNITED STATES PATENT OFFICE
CERTIFICATE OF CORRECTION

Patent No. 3,846,309  Dated November 5, 1974

Inventor(s) Lars Karl Johan Ehnstrom

It is certified that error appears in the above-identified patent and that said Letters Patent are hereby corrected as shown below:

One (1) sheet of drawings was omitted from the patent and should be included therein, as shown on the attached sheet.

Signed and Sealed this tenth Day of February 1976

[SEAL]

Attest:

RUTH C. MASON
Attesting Officer

C. MARSHALL DANN
Commissioner of Patents and Trademarks